(12) United States Patent
Li et al.

(10) Patent No.: US 10,788,907 B2
(45) Date of Patent: Sep. 29, 2020

(54) TOUCH DISPLAY SUBSTRATE, FABRICATION METHOD AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tiansheng Li, Beijing (CN); Zhenyu Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 455 days.

(21) Appl. No.: 15/757,935

(22) PCT Filed: Jun. 26, 2015

(86) PCT No.: PCT/CN2015/082456
§ 371 (c)(1),
(2) Date: Mar. 6, 2018

(87) PCT Pub. No.: WO2016/090896
PCT Pub. Date: Jun. 16, 2016

(65) Prior Publication Data
US 2018/0341355 A1  Nov. 29, 2018

(30) Foreign Application Priority Data
Dec. 10, 2014 (CN) .......................... 2014 1 0758636

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04111* (2013.01)

(58) Field of Classification Search
CPC .................. G06F 3/0412; G06F 3/044; G06F 2203/04111; G06F 2203/04103
See application file for complete search history.

(56) References Cited

U.S. PATENT DOCUMENTS 5,849,604 A * 12/1998 Sugawara ......... H01L 29/66757
438/30
6,128,051 A * 10/2000 Kim .................. G02F 1/136204
349/40

(Continued)

FOREIGN PATENT DOCUMENTS

| CN | 102034750 A | 4/2011 |
| CN | 104461142 A | 3/2015 |
| CN | 204242147 U | 4/2015 |

OTHER PUBLICATIONS

International Search Report dated Jun. 26, 2015, issued in counterpart International Application No. PCT/CN2015/082456 (13 pages).

*Primary Examiner* — Grant Sitta
(74) *Attorney, Agent, or Firm* — Westerman, Hattori, Daniels & Adrian, LLP

(57) ABSTRACT

The technical solution provides a touch display substrate, a fabrication method thereof, and a touch display device. The touch display substrate includes a conductive bridge (9) and a touch-control signal lead (7) formed over a base substrate (1). The touch-control signal lead (7) is in contact with a first surface portion of the conductive bridge (9). A passivation layer (2) is formed over the touch-control signal lead (7) and the conductive bridge (9). The passivation layer (2) includes a via-hole (3) to expose a second surface portion of the conductive bridge (9). A touch electrode (8) is formed over (Continued)

the passivation layer (2) and being connected to the conductive bridge (9). Through the via-hole (3), the touch electrode (8) is connected to the conductive bridge (9) and further connected to the touch-control signal lead (7).

18 Claims, 8 Drawing Sheets

(56) References Cited

U.S. PATENT DOCUMENTS

| | | | | |
|---|---|---|---|---|
| 7,538,399 B2* | 5/2009 | Kim | ........................ | H01L 21/84 257/401 |
| 7,692,443 B2* | 4/2010 | Jeon | ........................ | G09G 3/006 324/760.01 |
| 8,223,290 B2* | 7/2012 | Lee | .................... | G02F 1/133707 257/59 |
| 8,792,060 B2* | 7/2014 | Oh | .................... | G02F 1/136227 349/12 |
| 2009/0225249 A1 | 9/2009 | Wang et al. | | |
| 2010/0134426 A1* | 6/2010 | Lee | ........................ | G09G 3/3275 345/173 |
| 2011/0006998 A1 | 1/2011 | Kang et al. | | |
| 2012/0069257 A1* | 3/2012 | Oh | .................... | G02F 1/136227 349/42 |
| 2012/0138926 A1 | 6/2012 | Qin | | |
| 2013/0077034 A1* | 3/2013 | Jung | ........................ | G02F 1/1345 349/122 |
| 2013/0175552 A1* | 7/2013 | Liu | ........................ | H01L 33/08 257/88 |
| 2013/0194205 A1* | 8/2013 | Park | ........................ | G06F 3/047 345/173 |
| 2014/0152619 A1* | 6/2014 | Hotelling | ............. | G09G 3/3648 345/174 |
| 2014/0209913 A1 | 7/2014 | Song et al. | | |
| 2014/0306260 A1* | 10/2014 | Yamazaki | ........... | H01L 51/5012 257/99 |
| 2014/0354906 A1* | 12/2014 | Wu | ........................ | G06F 3/041 349/12 |
| 2015/0122771 A1* | 5/2015 | Teramoto | ............ | G06F 3/03547 216/17 |
| 2015/0145821 A1* | 5/2015 | Kim | ........................ | G06F 3/0412 345/174 |
| 2016/0018935 A1* | 1/2016 | Wei | ........................ | G06F 3/044 345/173 |
| 2017/0235396 A1* | 8/2017 | Gong | .................. | G02F 1/13338 349/12 |
| 2017/0269750 A1* | 9/2017 | Kang | .................. | G02F 1/13338 |
| 2018/0026057 A1* | 1/2018 | Zhang | .................. | H01L 27/142 257/72 |
| 2018/0026225 A1* | 1/2018 | Kwon | ................. | H01L 51/5237 257/40 |

* cited by examiner

TOUCH DISPLAY SUBSTRATE, FABRICATION METHOD AND TOUCH DISPLAY DEVICE

CROSS-REFERENCES TO RELATED APPLICATIONS

This application claims the priority of Chinese patent application No. CN201410758636.2, filed on Dec. 10, 2014, the entire content of which is incorporated herein by reference.

FIELD OF THE DISCLOSURE

The present disclosure generally relates to the field of display technologies and, more particularly, relates to a touch display substrate, a fabrication method of the touch display substrate, and a touch display device.

BACKGROUND

In current display market, thin and lightweight in-cell touch display devices have become more popular. For example, FIG. 1 illustrates a cross sectional schematic view of a conventional touch display substrate.

As shown in FIG. 1, the touch display substrate includes a base substrate 01 and a touch structure. The touch structure includes a touch-control signal lead 07 and a touch electrode 08. A passivation layer 02 is formed between the touch-control signal lead 07 and the touch electrode 08. A via-hole 03 is formed in the passivation layer 02 corresponding to the touch-control signal lead 07. The touch electrode 08 is electrically connected to the touch-control signal lead 07 through the via-hole 03. The touch-control signal lead 07 may be a three-layer stacked structure including a molybdenum (Mo) film 04, an aluminum (Al) film 05, and another Mo film 06 as shown in FIG. 1. Such stacked structure may be used to reduce the resistance of the touch-control signal lead 07.

However, during conventional fabrication process, when forming the via-hole 03 by etching the passivation layer 02, an inevitable over-etching may occur to partially etch the touch-control signal lead 07 under the passivation layer 02. In the case when the top layer, the Mo film 06, of the touch-control signal lead 07 is etched away, the Al film 05 is exposed in the air, oxidized, and then fractured. This may not allow the touch-control signal lead 07 to operate properly for transmitting signals.

The disclosed substrates, methods and devices are directed to at least partially solve one or more problems set forth above and other problems in the art.

BRIEF SUMMARY OF THE DISCLOSURE

The present disclosure provides a touch display substrate, a fabrication method of the touch display substrate and a touch display device including the touch display substrate, directed to solve at least the problem of over-etching of the touch-control signal lead when the passivation layer is etched to form the via-hole for electrical connection.

One aspect of the present disclosure provides a touch display substrate. The touch display substrate includes a base substrate, and a conductive bridge and a touch-control signal lead over the base substrate. The touch-control signal lead is in contact with a first surface portion of the conductive bridge. A passivation layer is over the touch-control signal lead and the conductive bridge. The passivation layer includes a via-hole to expose a second surface portion of the conductive bridge. A touch electrode is over the passivation layer and being connected to the conductive bridge.

Optionally, projections of the via-hole and the touch-control signal lead on the base substrate do not overlap with one another. Optionally, the first surface portion of the conductive bridge is sandwiched between the touch-control signal lead and the base substrate. Optionally, the touch-control signal lead is sandwiched between the first surface portion of the conductive bridge and the base substrate. Optionally, a closest distance between adjacent ends of the touch-control signal lead and the via-hole through the passivation layer is about 4 µm or greater in a direction along a surface of the base substrate.

Optionally, projections of the via-hole and the touch-control signal lead on the base substrate overlap with one another, and the touch-control signal lead is sandwiched between the conductive bridge and the base substrate.

Optionally, the touch-control signal lead includes one or more of: a first conductive material pattern made of at least an oxidation resistant conductive material, a second conductive material pattern made of at least a low resistance conductive material, and a third conductive material pattern made of at least an oxidation resistant conductive material.

Optionally, the second conductive material pattern is sandwiched between the first and third conductive material patterns.

Optionally, the touch display substrate further includes gate lines; data lines; a thin film transistor; and a pixel electrode. The gate lines and the data lines define a pixel cell; the thin film transistor and the pixel electrode are located in the pixel cell; and the pixel electrode is located under a drain electrode of the thin film transistor.

Optionally, the conductive bridge and the touch-control signal lead are disposed over a first surface portion of the base substrate, the pixel electrode is disposed over a second surface portion of the base substrate, and the data lines, the source electrode, and the drain electrode of the thin film transistor are disposed over a third surface portion of the base substrate.

Optionally, the conductive bridge is in a strip shape and with at least a portion containing the first surface portion configured in parallel with the touch-control signal lead.

To achieve the above objective, the present disclosure provides a touch display device. The touch display device includes the disclosed touch display substrate.

Another aspect of the present disclosure provides a method of fabricating a touch display substrate by forming a conductive bridge and a touch-control signal lead over a base substrate. The touch-control signal lead is in contact with a first surface portion of the conductive bridge. A passivation layer is formed over the touch-control signal lead and the conductive bridge. The passivation layer includes a via-hole to expose a second surface portion of the conductive bridge. A touch electrode is formed over the passivation layer and being connected to the conductive bridge.

Optionally, projections of the via-hole and the touch-control signal lead on the base substrate do not overlap with one another. Optionally, the first surface portion of the conductive bridge is sandwiched between the touch-control signal lead and the base substrate. Optionally, the touch-control signal lead is sandwiched between the first surface portion of the conductive bridge and the base substrate. Optionally, a closest distance between adjacent ends of the touch-control signal lead and the via-hole through the passivation layer is about 4 μm or greater in a direction along a surface of the base substrate.

Optionally, projections of the via-hole and the touch-control signal lead on the base substrate overlap with one another, and the touch-control signal lead is sandwiched between the conductive bridge and the base substrate.

Optionally, the touch-control signal lead includes one or more of: a first conductive material pattern made of at least an oxidation resistant conductive material, a second conductive material pattern made of at least a low resistance conductive material, and a third conductive material pattern made of at least an oxidation resistant conductive material.

Optionally, the second conductive material pattern is formed between the first and third conductive material patterns.

Optionally, gate lines, data lines, a thin film transistor, and a pixel electrode are formed over the base substrate. The gate lines and the data lines define a pixel cell; the thin film transistor and the pixel electrode are located in the pixel cell; and the pixel electrode is located under a drain electrode of the thin film transistor.

Optionally, the gate lines and a gate electrode are formed simultaneously on the base substrate in a single process. An insulating layer is formed on the gate lines and the gate electrode. An active layer is formed on the insulating layer by using a patterning process. The pixel electrode is formed on the insulating layer by using a patterning process. The conductive bridge or the touch-control signal lead is formed on the insulating layer over the base substrate. Data lines are formed on the insulating layer by using a patterning process. A source electrode and a drain electrode are formed on the active layer to connect the active layer with the pixel electrode.

Optionally, the pixel electrode and the conductive bridge are simultaneously formed in a single process. Optionally, the touch-control signal lead, the data lines, the source electrode, and the drain electrode are simultaneously formed in a single process.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
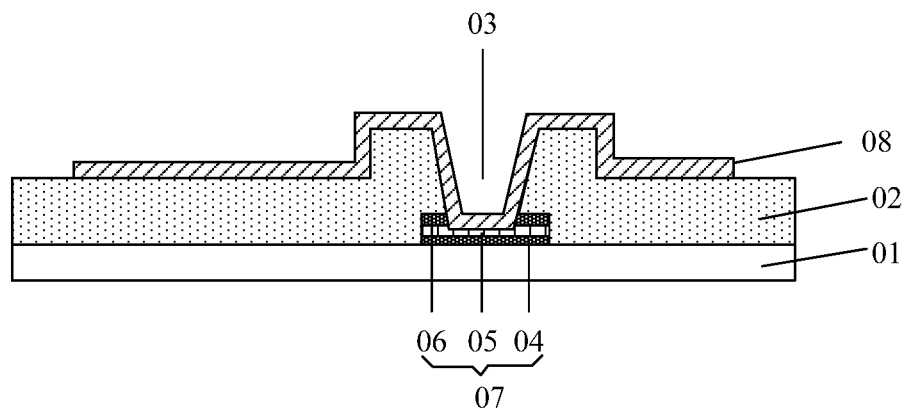
FIG. 1 illustrates a cross sectional view of a conventional touch display substrate.

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

The present disclosure provides a touch display substrate, a fabrication method of the touch display substrate, and a touch display device including the touch display substrate.

FIGS. 2a-2e illustrate cross-sectional views of various exemplary touch display substrates according to a first exemplary embodiment of the present disclosure.

As shown in FIGS. 2a-2e, the exemplary touch display substrate includes a base substrate 1, a passivation layer 2, a via-hole 3, a touch-control signal lead 7, a touch electrode 8, and a conductive bridge 9. In various embodiments, the base substrate may further include a display structure, a color film, and/or OLED structures.

Figure 2A:
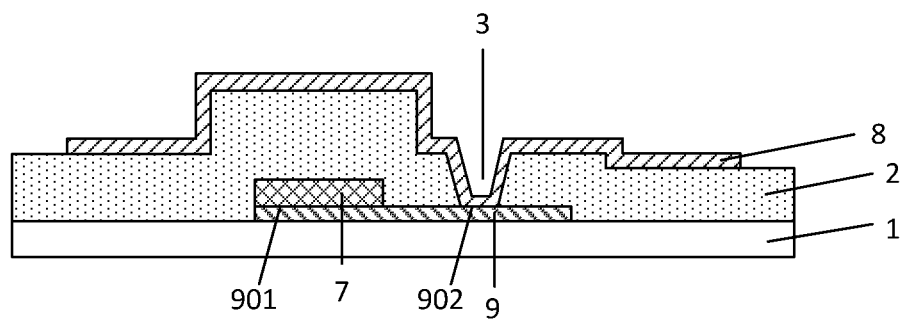
FIGS. 2a-2e illustrate cross sectional views of various exemplary touch display substrates according to various embodiment of the present disclosure.
Figure 2B:
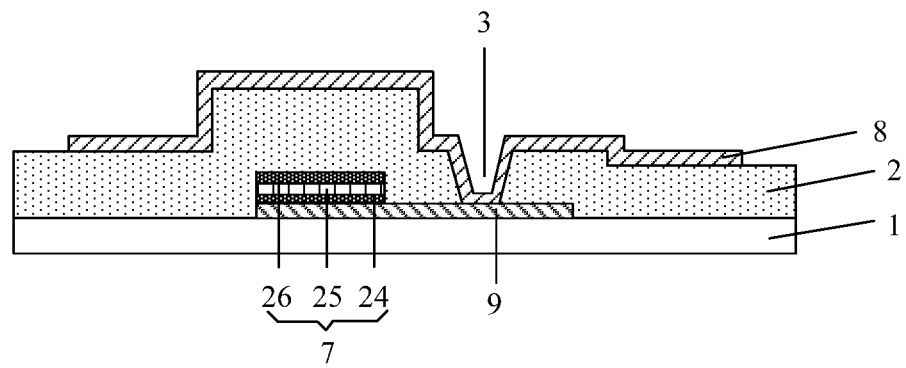

As shown in FIG. 2a-2b, each exemplary touch display substrate may include the base substrate 1 having the conductive bridge 9 and the touch-control signal lead 7 over the base substrate 1. The touch-control signal lead 7 is in contact with a first surface portion 901 of the conductive bridge 9. A passivation layer 2 is over the base substrate 1 including the touch-control signal lead 7 and the conductive bridge 9 disposed thereon. The passivation layer 2 includes a via-hole passing through the passivation layer 2 to expose a second surface portion 902 of the conductive bridge 9. A touch electrode 8 is on a top surface of the passivation layer 2, on sidewall surfaces of the via-hole, and on the second surface portion 902 of the conductive bridge 9 to connect to the conductive bridge 9.

In one embodiment as shown in FIGS. 2a-2b, the first surface portion 901 of the conductive bridge 9 is sandwiched between the touch-control signal lead 7 and the base substrate 1. The conductive bridge 9 is on the base substrate 1. The first surface portion 901 and the second surface portion 902 of the conductive bridge 9 are on a same side. For example, a closest distance between adjacent ends of the touch-control signal lead 7 and the via-hole 3 through the passivation layer 2 is about 4 μm or greater in a direction along a surface of the base substrate 1.

Figure 2C:
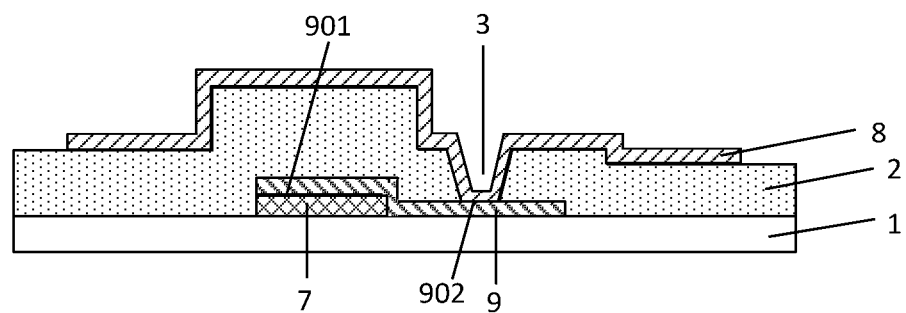

In another embodiment as shown in FIG. 2c, the touch-control signal lead 7 is sandwiched between the conductive bridge 9 and the base substrate 1. The first surface portion 901 and the second surface portion 902 of the conductive bridge 9 are on opposite sides.

Figure 2D:
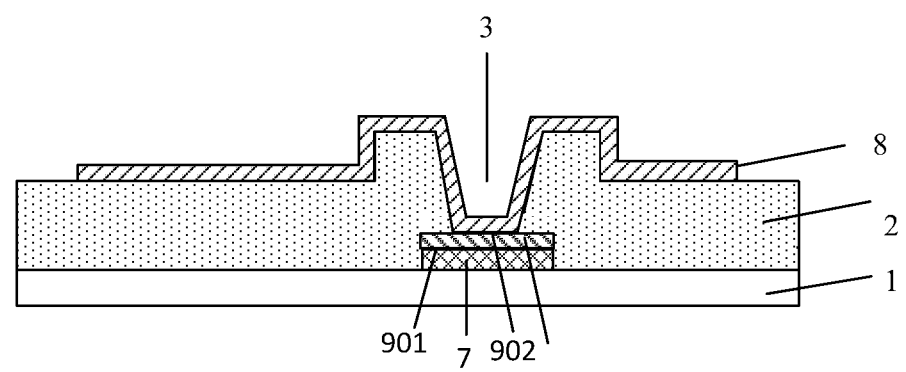
Figure 2E:
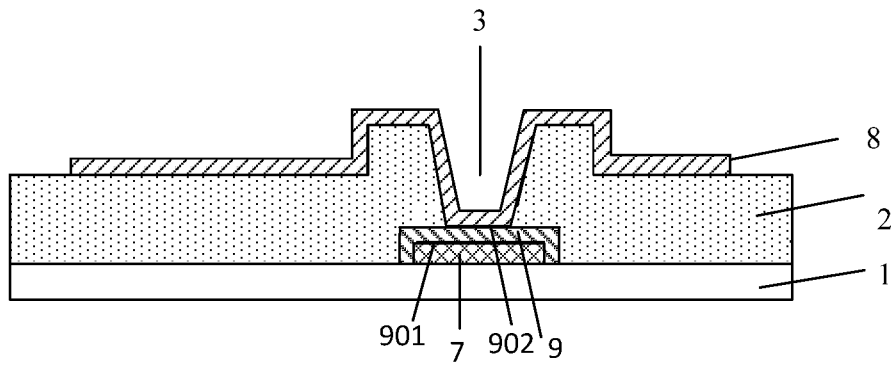

In yet another embodiment as shown in FIGS. 2d-2e, the touch-control signal lead 7 is sandwiched between the first surface portion 901 of the conductive bridge 9 and the base substrate 1. A portion of the conductive bridge 9 containing the second surface portion 902 is on the base substrate 1. The first surface portion 901 and the second surface portion 902 of the conductive bridge 9 are on opposite sides. For example, a closest distance between adjacent ends of the touch-control signal lead 7 and the via-hole 3 through the passivation layer 2 is about 4 μm or greater in a direction along a surface of the base substrate.

As such, projections of the via-hole 3 and the touch-control signal lead 7 on the base substrate may not overlap with one another (e.g., as shown in FIGS. 2a-2c) or may not overlap with one another (e.g., as shown in FIGS. 2d-2e).

For illustration purposes, the present disclosure is primarily described according to the exemplary touch display substrates shown in FIGS. 2a-2b as an example. For example, in FIGS. 2a-2b, the conductive bridge 9 may be formed on a surface portion of the base substrate 1 to partially cover the surface of the base substrate 1. The touch-control signal lead 7 may be formed on a first surface portion 901 of the conductive bridge 9 to partially cover a surface of the conductive bridge 9. The passivation layer 2 may be formed on the touch-control signal lead 7, on the base substrate 1 exposed by the conductive bridge 9, and on surface portions of the conductive bridge 9.

The via-hole 3 may be formed through the passivation layer 2 to expose a second surface portion 902 of the conductive bridge 9 that is not covered by the touch-control signal lead 7. The touch electrode 8 may be formed on the passivation layer 2, on sidewall surfaces of the via-hole 3 in the passivation layer 2, and on the second surface portion 902 of the conductive bridge 9 exposed by the via-hole 3, to connect to the conductive bridge 9 through the via-hole 3.

In one embodiment, because the via-hole 3 is formed through the passivation layer 2 to expose the second surface portion 902 of the conductive bridge 9 that is not covered by the touch-control signal lead 7, the etching process used to form the via-hole 3 in the passivation layer will not affect the touch-control signal lead 7. In the case even if an over-etching occurs, the touch-control signal lead 7 may not be etched. For example, a closest distance between adjacent ends of the touch-control signal lead and the via-hole through the passivation layer is about 4 μm or greater. Such distance may meet dimension requirements by exposure off and the etching techniques. In addition, if the distance is too close, e.g., less than 4 μm, the touch electrode lead 7 and the touch electrode 8 may be prone to generate short-circuit.

Optionally, the touch-control signal lead 7 may be a single layer, a double-layer, and/or a multi-layer. For example, the touch-control signal lead 7 may include one or more of: a first conductive material pattern made of at least an oxidation resistant conductive material, a second conductive material pattern made of at least a low resistance conductive material, and a third conductive material pattern made of at least an oxidation resistant conductive material.

In one embodiment, the touch-control signal lead 7 may be a double-layer structure. For example, the touch-control signal lead 7 may include a conductive material pattern 25 formed on the conductive bridge 9, and another conductive material pattern 26 stacked on the conductive material pattern 25, as shown in FIG. 2b. The conductive material pattern 25 may be made of at least one type of low resistance conductive material. The low resistance conductive material may be Al, AlNd, Cu, and/or Ag. The conductive material pattern 26 may be made of at least one type of oxidation resistant conductive material. The oxidation resistant conductive material may be Cr, Ti, Mo and/or MoW.

In another embodiment, the touch-control signal lead 7 may be a three-layer structure, as shown in FIG. 2b. Compared to the touch-control signal lead 7 having the double-layer structure, the touch-control signal lead 7 in a three-layer structure may have a first conductive material pattern 24 formed on the conductive bridge 9, a second conductive material pattern 25 stacked on the first conductive material pattern 24, and a third conductive material pattern 26 stacked on the second conductive material pattern 25 (as shown in FIG. 2b). The first conductive material pattern 24 may be made of at least one type of oxidation resistant conductive material. The oxidation resistant conductive material may be Cr, Ti, Mo, and/or MoW.

Figure 3:
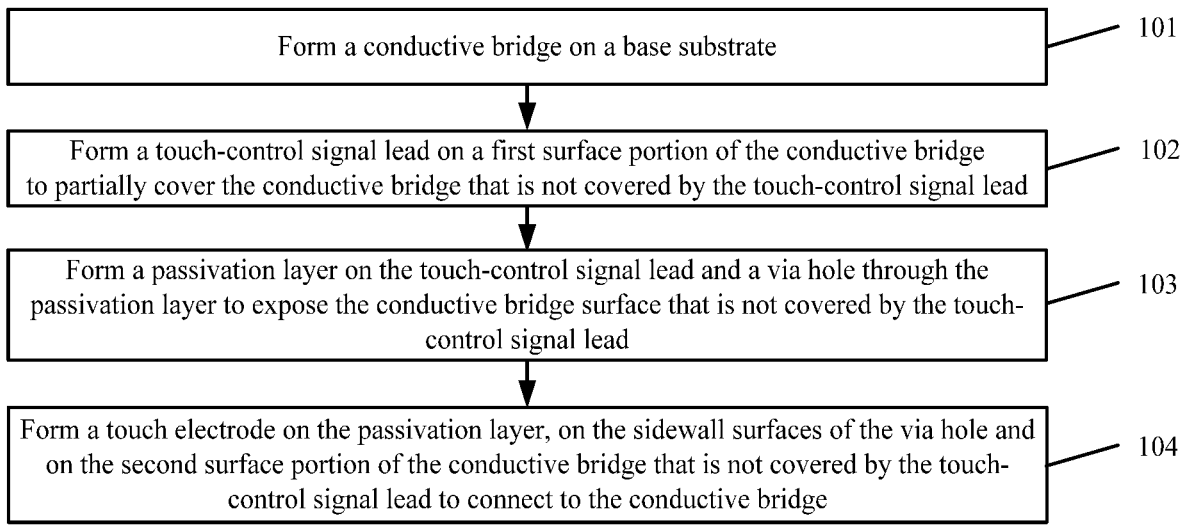
FIG. 3 illustrates a flow chart of an exemplary method for fabricating an exemplary touch display substrate according to a first exemplary embodiment of the present disclosure.

The first exemplary embodiment of the present disclosure also provides a method of fabricating an exemplary touch display substrate, for example, as shown in FIG. 2b. FIG. 3 illustrates a flow chart of an exemplary method for fabricating an exemplary touch display substrate according to a first exemplary embodiment of the present disclosure. As shown in FIG. 3, the method may include the following steps.

Step 101: a conductive bridge is formed on a base substrate.

In the Step 101, a conductive material film may be formed on the base substrate 1. Then a patterning process may be applied to the conductive material film to form a pattern of the conductive bridge 9.

The conductive material film may be formed by depositing, coating, or sputtering. The disclosed patterning process may include coating a photoresist layer, exposing the photoresist layer, developing the exposed photoresist layer, etching conductive material film, and removing the photoresist layer.

Step 102: a touch-control signal lead is formed on a first surface portion of the conductive bridge to partially cover the conductive bridge.

In the Step 102, a three-layer structure containing Mo/Al/Mo may be described herein as an example for illustrating the touch-control signal lead 7. For example, a first Mo film, an Al film and a second Mo film may be formed sequentially on the base substrate 1. The Al film may be sandwiched between the first and second Mo films together on an entire surface from Step 101. Then a patterning process may be applied to the three stacked conductive material films to form a pattern of the touch-control signal lead 7. The touch-control signal lead 7 may partially cover the surface of the conductive bridge 9.

Any suitable shapes and positions of the touch-control signal lead 7 and the conductive bridge 9 may be encompassed herein without limiting the scope of the present disclosure. The shapes and relative positions of the touch-control signal lead 7 and the conductive bridge 9 in FIG. 2b are descried herein as an example for illustration purpose. The disclosed touch-control signal lead 7 may overlap with the conductive bridge 9 in a direction perpendicular to a surface of the base substrate 1. The disclosed conductive bridge 9 may have a surface area not covered by the touch-control signal lead 7 but connected to the touch electrode 8 on the via-hole 3.

Step 103: a passivation layer is formed on the touch-control signal lead and the via-hole is formed through the passivation layer to expose a second surface portion of the conductive bridge that is not covered by the touch-control signal lead.

In the Step 103, a passivation material film may be formed on the substrate 1 containing the touch-control signal lead 7 and the conductive bridge 9. Then a patterning process may be applied to the passivation material film to etch the via-hole 3 though the passivation material film to expose the second surface portion 902 of the conductive bridge 9 that is not covered by the touch-control signal lead 7. The remaining passivation material film pattern may be used as the passivation layer 2.

Step 104: a touch electrode is formed on the passivation layer to connect to the conductive bridge through the via-hole.

In the Step 104, a touch electrode material film may be formed on the passivation layer 2. Then a patterning process may be applied to the touch electrode material film to form a pattern of the touch electrode 8. At this point, the touch electrode 8 formed in the via-hole 3 of the passivation layer 2 may be connected to the conductive bridge 9 formed underlying the passivation layer 2.

As such, the first exemplary embodiment of the present disclosure provides a touch display substrate and a method of fabricating the touch display substrate.

The touch display substrate includes a base substrate; a conductive bridge formed on a surface portion of the base substrate; a touch-control signal lead formed on a first surface portion of the conductive bridge over the base substrate to partially cover the conductive bridge; a passivation layer formed on the base substrate containing the conductive bridge and the touch-control signal lead thereon; a via-hole formed through the passivation layer to expose a second surface portion of the conductive bridge that is not covered by the touch-control signal lead; and a touch electrode formed on the passivation layer, on the sidewall surfaces of the via-hole and on the second surface portion of the conductive bridge exposed by the via-hole to connect to the conductive bridge.

In present disclosure, the touch-control signal lead is formed on the first surface portion of the conductive bridge and over the base substrate to partially cover the conductive bridge. The via-hole is formed through the passivation layer to expose the second surface portion of the conductive bridge that is not covered by the touch-control signal lead. Thus, when the etching process is used to etch the via-hole, even if over-etching occurs, the touch-control signal lead is not etched.

Figure 4:
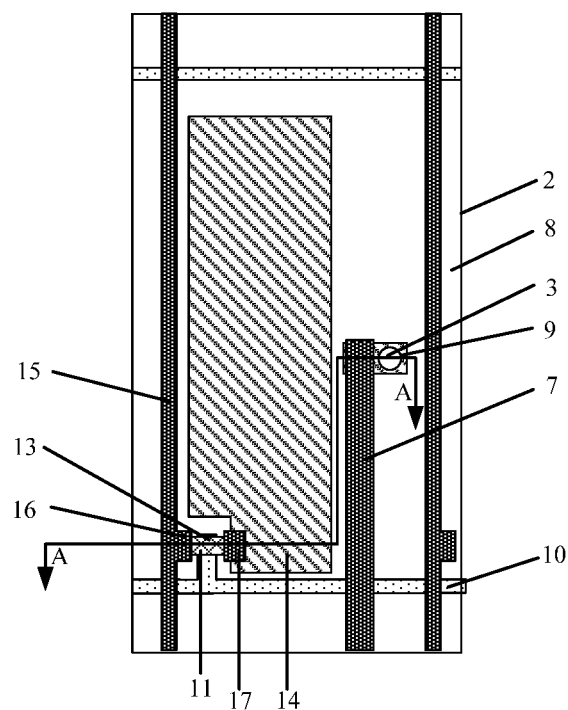
FIG. 4 illustrates a top view of another exemplary touch display substrate according to a second exemplary embodiment of the present disclosure.
Figure 5:
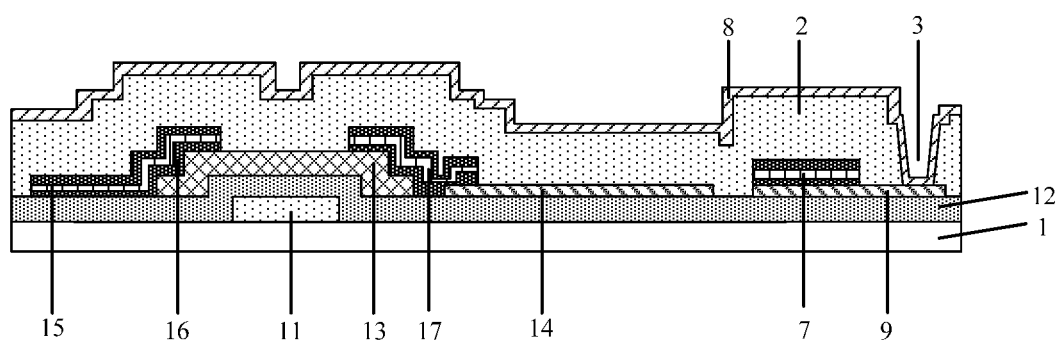
FIG. 5 illustrates a cross sectional view in the A-A direction of FIG. 4 according to the second exemplary embodiment of the present disclosure.

The second embodiment of the present disclosure is described in detail below. FIG. 4 illustrates a top view of another exemplary touch display substrate according to a second exemplary embodiment of the present disclosure. FIG. 5 illustrates a cross sectional view in the A-A direction of FIG. 4.

As shown in FIGS. 4-5, in addition to the touch structure including the touch-control signal lead 7, the conductive bridge 9, and the touch electrode 8 (as depicted in FIGS. 2-3), the touch display substrate may also have a display structure.

The display structure may include gate lines 10, data lines 15, a thin film transistor (TFT), and a pixel electrode 14. The gate lines 10 and the data lines 15 may define a pixel cell. The thin film transistor and the pixel electrode 14 may be located in the pixel cell.

For illustration purposes, the present disclosure is described to further include a thin film transistor (TFT), although any suitable structures, components, and/or devices may be formed over the base substrate, in addition to having the conductive bridge 9 and the touch-control signal lead 7 formed over the base substrate.

For example, the thin film transistor may include a gate electrode 11, an active layer 13, a source electrode 16 and a drain electrode 17. The gate electrode 11 and the gate lines 10 may be formed simultaneously on the base substrate 1 in a single process. An insulating layer 12 may be formed on the gate lines 10 and the gate electrode 11. The data lines 15, the active layer 13 and the pixel electrode 14 may be disposed on the insulating layer 12. The source electrode 16 and the drain electrode 17 may be disposed on the active layer 13. The source electrode 16, the drain electrode 17, and the data lines 15 may be formed in a single process. The drain electrode 17 may be connected to a portion of the surface of the pixel electrode 14. For example, the drain electrode 17 may connect to the pixel electrode 14 by filling corresponding materials in a via-hole formed through the pixel electrode 14 and on the insulating layer 12 as shown in FIG. 5. The passivation layer 2 may be disposed on the data lines 15, the source electrode 16, the drain electrode 17, a surface portion of the active layer 13, the pixel electrode 14, a surface portion of the insulating layer 12, the touch-control signal lead 7, and/or the conductive bridge 9.

Figure 6:
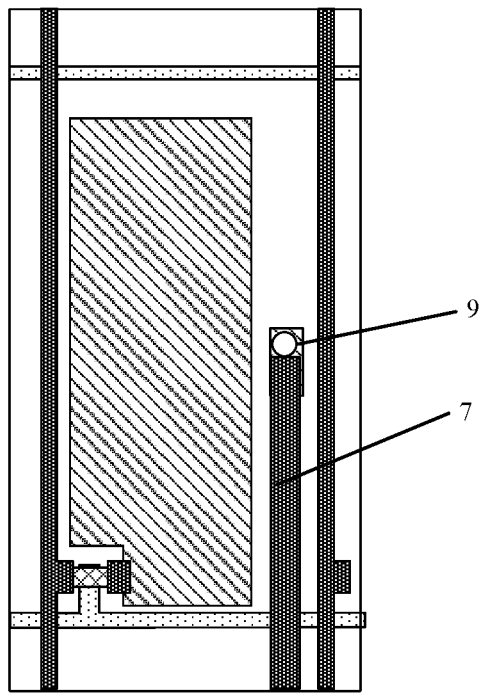
FIG. 6 illustrates a top view of another exemplary touch display substrate according to the second exemplary embodiment of the present disclosure.

Any suitable position and configuration of the conductive bridge 9 may be encompassed herein without limiting the scope of the present disclosure. For example, FIG. 6 illustrates a top view of another exemplary touch display substrate according to the second exemplary embodiment of the present disclosure. As shown in FIG. 6, the conductive bridge may be in a strip shape. The conductive bridge 9 may be disposed in a direction parallel with the length direction of the touch-control signal lead 7. Compared with the touch display substrate shown in FIG. 4, the touch display substrate shown in FIG. 6 may have an increased display area, i.e., have a reduced non-display area, in the pixel cell. Thus, the aperture ratio of the pixel cell may be improved.

The disclosed conductive bridge 9 may be used to electrically connect the touch electrode 8 and the touch-control signal lead 7. The conductive bridge 9 may have other suitable positions or configurations, which may be encompassed in the present disclosure.

In an exemplary embodiment, the conductive bridge 9 in the touch structure and the pixel electrode 14 in the display structure may be simultaneously formed over the base substrate 1. In other words, the conductive bridge 9 and the pixel electrode 14 may be formed in the same patterning process on the base substrate 1 to simplify the fabrication process.

Further, the touch-control signal lead 7, and the data lines 15, the source electrode 16 and the drain electrode 17 of the thin film transistor, may be simultaneously formed over the base substrate 1. In other words, the touch-control signal lead 7, the data lines 15, the source electrode 16 and the drain electrode 17 may be formed in a single patterning process.

In addition, it should be noted that the touch display substrate according to the present embodiment may be an advanced super dimension switch (ADS)-type self-capacitance touch display substrate. Accordingly, the touch display substrate may have a common electrode. The touch electrode 8 in the self-capacitance touch structure may be used as the common electrode. Specifically, in the touch phase, the touch electrode 8 may carry a touch-control signal. In the display phase, the touch electrode 8 may carry a common voltage signal.

The second exemplary embodiment of the present disclosure also provides a method of fabricating the disclosed touch display substrate as show in FIG. 4. FIGS. 7a-7e illustrate structural views of another exemplary touch display substrate corresponding to certain stages of a fabrication process according to the second exemplary embodiment of the present disclosure. As shown in FIGS. 7a-7e, the method may include the following exemplary steps.

Figure 7A:
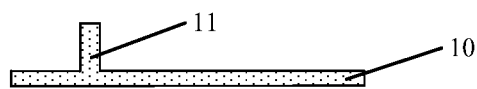
FIGS. 7a-7e illustrate structural views of another exemplary touch display substrate corresponding to certain stages of a fabrication process according to the second exemplary embodiment of the present disclosure.

As shown in FIG. 7a, a gate conductive material film may be formed on the base substrate 1. Then a patterning process may be applied to the gate conductive material film to form a pattern of the gate electrode 11 and a pattern of the gate lines 10 on the base substrate.

An insulating layer may be formed on the gate lines and the gate electrode. For example, a vapor deposition process may be used to form an insulating material layer on the gate lines 10 and the gate electrode 11. The insulating layer 12 (not shown in the top view figures) may then be formed.

Figure 7B:
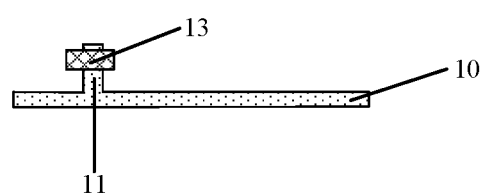

As shown in FIG. 7b, a semiconductor film may be formed on the insulating layer 12. Then a patterning process may be applied to the semiconductor film to form a pattern of the active layer 13.

Figure 7C:
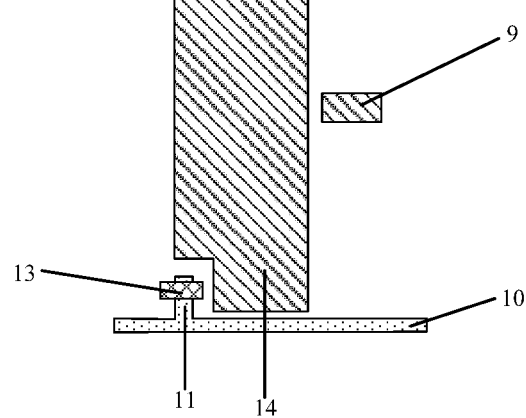

As shown in FIG. 7c, a transparent conductive material (for example, ITO) film may be formed on the insulating layer 12. Then a pattering process may be applied to the transparent conductive material film to form a pattern of the pixel electrode 14 and a pattern of the conductive bridge 9.

In one embodiment, the pixel electrode 14 and the conductive bridge 9 are formed in a single patterning process to simplify the fabrication process. However, the scope of the present disclosure is not limited herein.

Figure 7D:
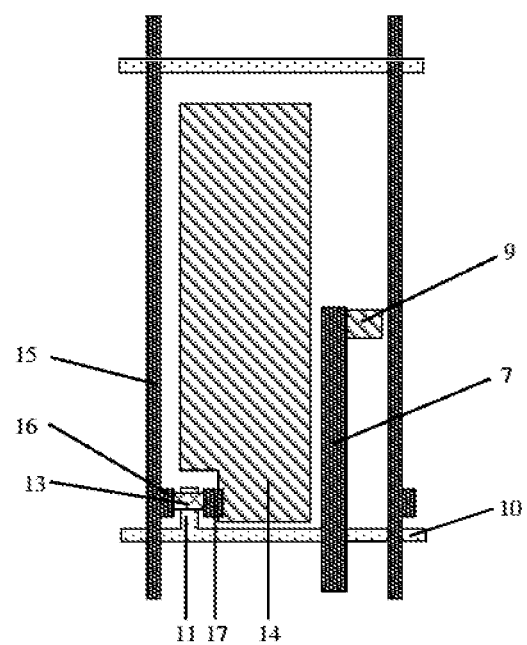

As shown in FIG. 7d, for the illustrative purposes, a three-layer stacked structure including a molybdenum (Mo) film, an aluminum (Al) film and another molybdenum (Mo) film may be used to form the data lines 15, the source electrode 16, the drain electrode 17 and the touch-control signal lead 7. For example, the Mo film, the Al film and another Mo film may be sequentially formed on the base substrate 1. A patterning process may be applied to the three-layer stacked conductive material films to form the data lines 15 on the insulating layer 12, the source electrode 16 and the drain electrode 17 on the active layer 13, and the touch-control signal lead 7 on the conductive bridge 9. The drain electrode 17 may be connected to the active layer 13 and the pixel electrode 14. The touch-control signal lead 7 may partially cover the surface of the conductive bridge 9. At this point, the gate electrode 11, the active layer 13, the source electrode 16 and the drain electrode 17 together may form the thin film transistor on the base substrate 1.

In one embodiment, the touch-control signal lead 7, the data lines 15, the source electrode 16 and the drain electrode 17 may be formed in a single patterning process to simplify the fabrication process. However, the scope of the present disclosure is not limited herein.

Figure 7E:
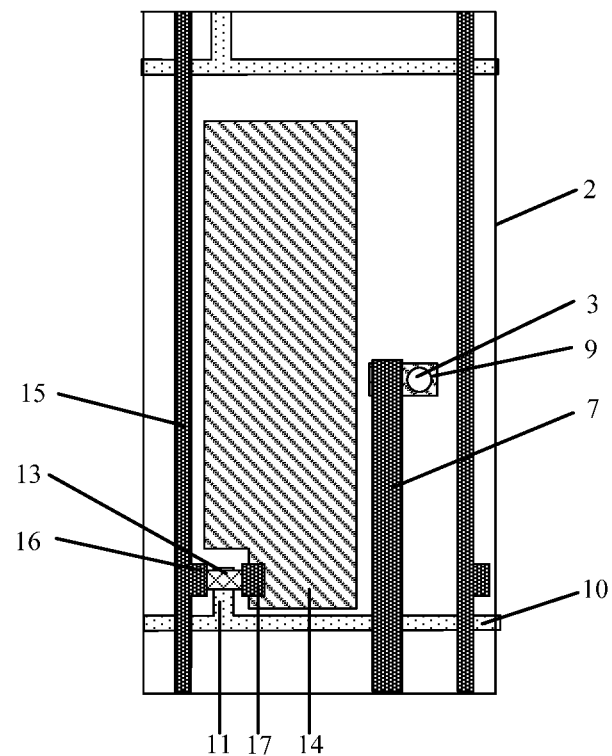

As shown in FIG. 7e, a passivation material film may be formed to cover the data lines 15, the source electrode 16, the drain electrode 17 and the touch-control signal lead 7. Then a patterning process may be used to etch the via-hole through the passivation layer to expose a second surface portion of the conductive bridge that is not covered by the touch-control signal lead 7. The remaining passivation material film may be used as the passivation layer 12.

As shown in FIG. 4, a touch electrode material film may be formed on the passivation layer 2, on the sidewall surfaces of the via-hole and on the second surface portion of the conductive bridge exposed by the via-hole. Then a patterning process may be applied to the touch electrode material film to form a pattern of the touch electrode 8. At this point, the touch electrode 8 may be connected to the conductive bridge 9 by filling the via-hole 3 through the passivation layer 2.

It should be note that when the fabricated touch display substrate is an ADS-type self-capacitance touch display substrate, the touch electrode 8 formed in the Step 207 may be used as the common electrode.

The second exemplary embodiment of the present disclosure provides a touch display substrate and the fabrication method thereof. The touch display substrate includes a base substrate; a conductive bridge formed on the base substrate and disposed in a same layer level as a pixel electrode; a touch-control signal lead formed on a first surface portion of the conductive bridge and disposed in a same layer level as data lines; a source electrode and a drain electrode, to partially cover the surface of the conductive bridge; a passivation layer formed on the touch-control signal lead; a via-hole formed through the passivation layer to expose a second surface portion of the conductive bridge that is not covered by the touch-control signal lead; and a touch electrode formed on the passivation layer, on the sidewall surfaces of the via-hole and on the second surface portion of the conductive bridge exposed by the via-hole to connect to the surface of the conductive bridge that is not covered by the touch-control signal lead through the via-hole.

In present disclosure, the touch-control signal lead is formed on the first surface portion of the conductive bridge to partially cover the conductive bridge. The via-hole is formed through the passivation layer to expose the second surface portion of the conductive bridge that is not covered by the touch-control signal lead. Thus, when the etching process is used to etch the via-hole, even if over-etching occurs, the touch-control signal lead is not etched.

In addition, because the conductive bridge of the touch display substrate is disposed in a same layer level as the pixel electrode, the pixel electrode and the conductive bridge can be formed at the same time or in a same process. Because the touch-control signal lead is disposed in a same layer level as the data lines, the source electrode and the drain electrode, the touch-control signal lead, the data lines, the source electrode and the drain electrode can be formed at the same time in a same process. Thus, the present disclosure effectively simplifies the process of fabricating the touch display substrate.

The third exemplary embodiment provides a touch display device. The touch display device includes the touch display substrate fabricated in the process according to the first and the second embodiments of the present disclosure. The details are described in the description of the first and the second embodiments. In one embodiment, the exemplary touch display device, such as an in-cell touch display device, may further include a plurality of display pixels and display control circuit.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A touch display substrate, comprising:
   a base substrate;
   a conductive bridge and a touch-control signal lead over the base substrate, wherein the touch-control signal lead is in contact with a first surface portion of the conductive bridge;
   a passivation layer over the touch-control signal lead and the conductive bridge, wherein the passivation layer includes a via-hole to expose a second surface portion of the conductive bridge;
   a touch electrode over the passivation layer and being connected to the conductive bridge through the via-hole;
   gate lines;
   data lines;
   a thin film transistor; and
   a pixel electrode,
   wherein:
   the gate lines and the data lines define a pixel cell;
   the thin film transistor and the pixel electrode are located in the pixel cell;
   the pixel electrode is located under a drain electrode of the thin film transistor;

orthographic projection of the conductive bridge on the substrate has no overlapping with orthographic projection of the gate lines on the substrate; and the first surface portion of the conductive bridge is electrically connected to the second surface portion of the conductive bridge.

2. The touch display substrate of claim 1, wherein projections of the via-hole and the touch-control signal lead on the base substrate do not overlap with one another.

3. The touch display substrate of claim 2, wherein:
the first surface portion of the conductive bridge is sandwiched between the touch-control signal lead and the base substrate.

4. The touch display substrate of claim 2, wherein:
the touch-control signal lead is sandwiched between the first surface portion of the conductive bridge and the base substrate.

5. The touch display substrate of claim 1, wherein projections of the via-hole and the touch-control signal lead on the base substrate overlap with one another, and the touch-control signal lead is sandwiched between the conductive bridge and the base substrate.

6. The touch display substrate of claim 2, wherein a closest distance between adjacent ends of the touch-control signal lead and the via-hole through the passivation layer is about 4 μm or greater in a direction along a surface of the base substrate.

7. The touch display substrate of claim 1, wherein the touch-control signal lead includes one or more of:
a first conductive material pattern made of at least an oxidation resistant conductive material,
a second conductive material pattern made of at least a low resistance conductive material, and
a third conductive material pattern made of at least an oxidation resistant conductive material.

8. The touch display substrate of claim 7, wherein the second conductive material pattern is sandwiched between the first and third conductive material patterns.

9. The touch display substrate of claim 1, wherein:
the conductive bridge and the touch-control signal lead are disposed over a first surface portion of the base substrate,
the pixel electrode is disposed over a second surface portion of the base substrate, and
the data lines, the source electrode, and the drain electrode of the thin film transistor are disposed over a third surface portion of the base substrate.

10. The touch display substrate of claim 1, wherein the conductive bridge is in a strip shape and with at least a portion containing the first surface portion configured in parallel with the touch-control signal lead.

11. A touch display device, comprising the touch display substrate of claim 1.

12. A method of fabricating a touch display substrate, comprising:
forming a conductive bridge and a touch-control signal lead over a base substrate, wherein the touch-control signal lead is in contact with a first surface portion of the conductive bridge;
forming a passivation layer over the touch-control signal lead and the conductive bridge, wherein the passivation layer includes a via-hole to expose a second surface portion of the conductive bridge;
forming a touch electrode over the passivation layer and being connected to the conductive bridge through the via-hole; and
forming gate lines, data lines, a thin film transistor, and a pixel electrode over the base substrate, wherein:
the gate lines and the data lines define a pixel cell;
the thin film transistor and the pixel electrode are located in the pixel cell;
the pixel electrode is located under a drain electrode of the thin film transistor;
orthographic projection of the conductive bridge on the substrate has no overlapping with orthographic projection of the gate lines on the substrate; and
the first surface portion of the conductive bridge is electrically connected to the second surface portion of the conductive bridge.

13. The method of claim 12, wherein projections of the via-hole and the touch-control signal lead on the base substrate do not overlap with one another, and a closest distance between adjacent ends of the touch-control signal lead and the via-hole through the passivation layer is about 4 μm or greater in a direction along a surface of the base substrate.

14. The method of claim 13, wherein:
the first surface portion of the conductive bridge is sandwiched between the touch-control signal lead and the base substrate, or the touch-control signal lead is sandwiched between the first surface portion of the conductive bridge and the base substrate.

15. The method of claim 12, wherein:
projections of the via-hole and the touch-control signal lead on the base substrate overlap with one another, and the touch-control signal lead is sandwiched between the conductive bridge and the base substrate.

16. The method of claim 12, further including:
forming the gate lines and a gate electrode simultaneously on the base substrate in a single process;
forming an insulating layer on the gate lines and the gate electrode;
forming an active layer on the insulating layer by using a patterning process;
forming the pixel electrode on the insulating layer by using a patterning process;
forming the conductive bridge or the touch-control signal lead on the insulating layer over the base substrate;
forming data lines on the insulating layer by using a patterning process; and
forming a source electrode and a drain electrode on the active layer to connect the active layer with the pixel electrode.

17. The method of claim 12, wherein the pixel electrode and the conductive bridge are simultaneously formed in a single process.

18. The method of claim 12, wherein the touch-control signal lead, the data lines, the source electrode, and the drain electrode are simultaneously formed in a single process.

* * * * *